Figure 1:
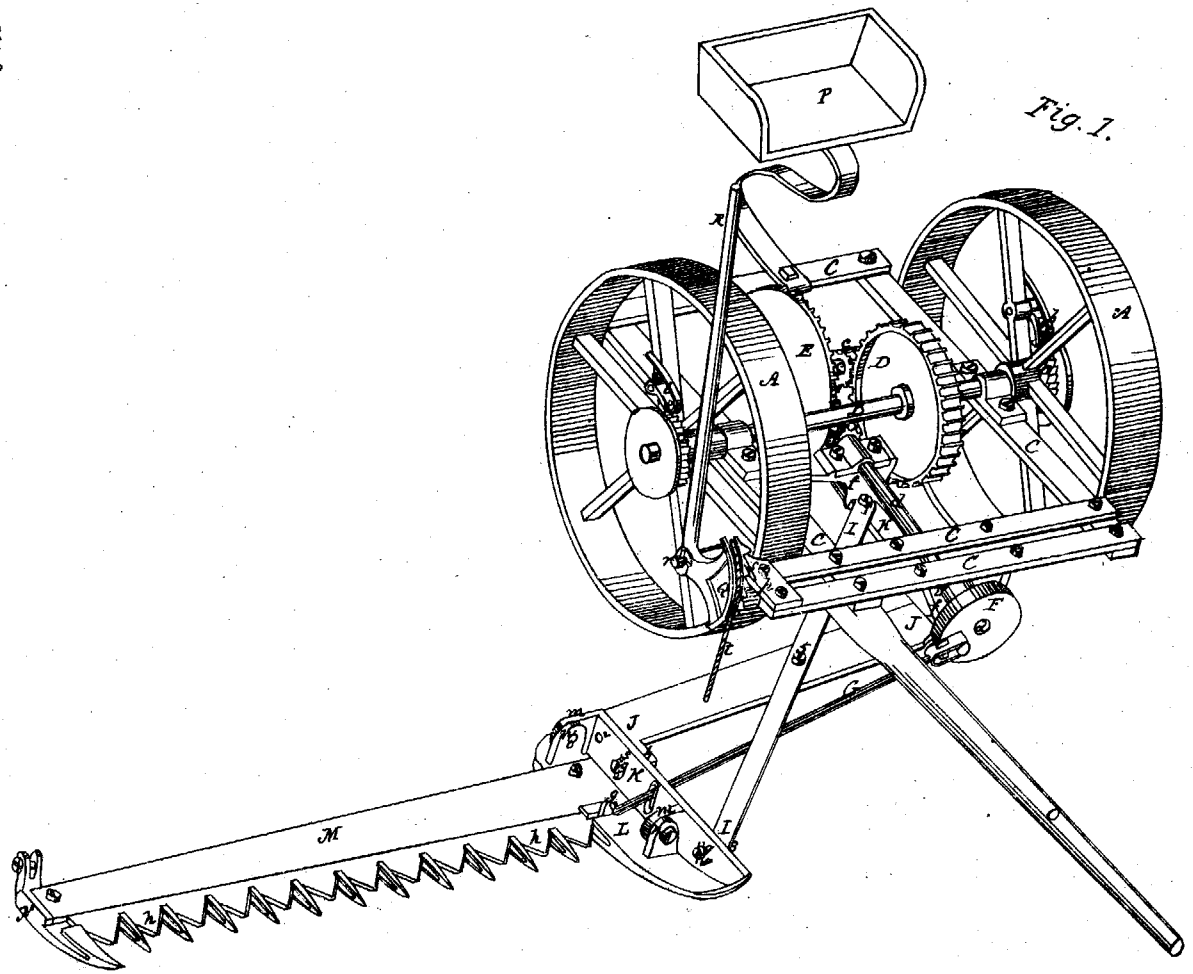

W. K. Miller.

Mower.

Div. B. 2267 Div. B. Reissued Jun. 5, 1866.

Witnesses.
A. B. Stoneykiser
Thos. H. Upperman

W. K. Miller

UNITED STATES PATENT OFFICE.

WILLIAM K. MILLER, OF CANTON, OHIO.

IMPROVEMENT IN HARVESTERS.

Specification forming part of Letters Patent No. 22,885, dated February 8, 1859; Reissue No. 2,267, dated June 5, 1866.

DIVISION B.

*To all whom it may concern:*

Be it known that I, WILLIAM K. MILLER, of Canton, in the county of Stark, State of Ohio, have invented certain new and useful Improvements in Harvesting-Machines for Cutting Grass or Grain; and I do hereby declare the following to be a full, clear, and exact description of the construction and operation of the same, reference being had to the accompanying drawings, making a part of this specification, in which—

Figure 1 represents a perspective view of the machine with the covering removed, to show the gearing and parts underneath it. Fig. 2 represents a top view of a portion of the frame and the connection of the finger-bar thereto. Fig. 3 represents a vertical section through the frame and finger-bar and portions of their connections.

Similar letters of reference, where they occur in the several figures, denote like parts of the machine in all the drawings.

My invention consists in a short finger-beam so hinged to a coupling arm or brace that is, in turn, hinged to the main frame, as that said finger-beam may be raised up folded to the rear in line with the driving-wheels, for contracting the space occupied by the machine in operation when moving it to or from the field; and my invention further consists in so constructing and arranging the hinged or pivoted point on which the finger-beam is thus folded backward as that the outer or free end of said finger-beam may conform to the inequalities of the ground over which it is drawn and independent of the vertical movement of the machine itself.

To enable others skilled in the art to make and use my invention, I will proceed to describe the same with reference to the drawings.

A pair of supporting and driving wheels, A A, are so connected to an axle, B, by a ratchet and pawl, *a b*, as to turn with or independent of said axle, as circumstances may require.

The main frame C, which is of quadrangular form, is supported on or by the axle B, so as to be as nearly balanced thereon as will best conduce (with the driver or operator in his seat) to an efficient operation of its parts.

On the axle B there is a cog-wheel, D, which takes into a pinion, *c*, on a shaft, *e*, suitably supported in bearings on the main frame C, and this shaft *e* thus receives its motion. The shaft *e* carries a bevel-gear wheel, E, which takes into and turns a bevel-pinion, *i*, on a shaft, *d*, which shaft has its bearings in the hangers *f f*, which are firmly connected to the main frame, and thus the shaft *d* receives its motion.

A crank-wheel, F, is connected to the front end of the shaft *d* to a wrist-pin, in which one end of the pitman or connecting-rod G is attached, the other end thereof being attached to a stud or projection, *g*, on the end of the cutter-bar, to give motion to the cutters *h*.

In the hangers *f f* are also supported the journals *k* of a rocking bar, H, to which the two braces I J are firmly attached by their ends 1 2, respectively, the other ends, 3 4, thereof being also (when properly adjusted) rigidly attached to the hinge-plate K, and where the braces I J cross each other they are also rigidly united, as seen at 5. It will be perceived from this union of the parts just above described that any motion which the hinge-plate K and the braces I J may have is solely through the rocking of the bar H on its journals, and that though they thus constitute a rigid framework to properly support the finger-bar, yet they have all the free play or motion necessary to allow the finger-bar to rise and fall to all the undulations of the ground, or to be raised or lowered and held at any desired height above the ground, or to be raised up and folded over onto the frame C, or to be swung underneath the main frame, or even to putting the cutting apparatus on the other side of the machine, as some users prefer having it and as will be hereinafter explained.

The hinge-plate K may be connected to the brace J at the point 7 by a pivot, on which it may turn as a center; or this pivot may pass through a slot in said hinge-plate, if found essential, so that said plate may be raised or lowered thereon at its rear portion as well as its front end; but generally the adjustment at its front will be found ample, and then the rear portion can turn on its pivot 7.

Slots 8 8 are cut through the hinge-plate K for the set-screws 9 9, that hold it firmly to the braces, or the flanges on the ends of the braces to pass through, and thus the hinge-plate is made adjustable to the braces I J; but when adjusted it is then rigidly attached, so that they can only move together, and not independent of each other.

On the adjustable hinge-plate K are two lugs, *m m*, to which is pivoted, by its two corresponding lugs, *n n*, the shoe L, and to this shoe the finger-bar M is firmly connected by one of its ends, the other end being similarly connected to the outer shoe or divider, N. The joints made by the separate pivots *o o* may be as well made by a single rod passing through both sets of lugs, and would be more readily removed when it is desirable to detach the shoe L for any purpose.

O is the tongue to which the team is hitched, and P is the driver's seat. Q is a segmental ratchet pivoted at *r* to a bar, *p*, that is fast to or a part of the main frame, and R is a handle or lever attached to the ratchet and extending back to a position convenient for the driver to grasp from his seat. There is a tooth, *s*, on the plate *p*, upon which the notches of the ratchet will take and hold at any desired height. A cord or chain, *t*, connects the bar J to this segmental rack Q, and thus the driver or conductor from his seat can raise up and let down the finger-bar at pleasure, or arrange it any proper height, and cause it to be held at such regulated height.

The pawls *b b* are spring-and-pivot pawls, so that they can be thrown into and out of action and held in either position by said springs, so that the jarring of the machine will not affect them.

The hinge-plate K is not affected by any rising or falling motion of the finger-bar as it passes over and yields to the undulations or inequalities of the ground over which it is drawn when cutting, for, as seen in Fig. 3, the shoe and finger-bar L M can rise without changing the position of the said hinge-plate, they simply playing on their hinge-joints, while the hinge-plate is rigidly fastened to the braces I J, and can only move when they move, and the motion which these braces, in turn, have is that only which they receive through the rocking bar H.

The finger-bar can be raised up and folded over onto the main frame for transportation, if it is desirable to do so, and the whole machinery may be transposed by swinging the braces, hinge-plate, shoes, and finger-bar and cutters underneath the frame and to its opposite side. Then detach the hinge-plate from the braces, with the parts connected to it, and turn them over, and again connect them by the same set-screws, slots, and pivots, which may all be readily made and arranged for such a purpose. Shift the tongue to what was before the rear of the frame, and bring the seat back to what was before the front of the machine, and the harvester has been converted from one which had its cutting apparatus in the front to one which has its cutting apparatus at the rear of the frame, and this, too, without any pieces being taken away or added to the machine; and in both these positions the cutting apparatus will be on the right-hand side of the driver.

The machines, if made "left-hand," as it is termed, may undergo the same changes of position of the cutting portions, but to change from right to left on the same machine would require the removal of some and the substitution of other parts, which would be, in effect, making another machine, and not converting it, in its entirety, from a front to a rear cutting machine, and vice versa, by simply turning around or reversing the same parts. In my case I may say that I simply turn over or reverse the several parts to effect the above-described object, and do not add to them or take away anything essential to the change and the operation of the machine in either of its changes from front to rear, or vice versa.

The leading characteristics of this part of my invention are, first, the folding up, in a particular way, of the finger, and so arranging the hinge upon which it turns as to allow the finger-bar to ride over the ground and rise and fall to its inequalities. When the finger-bar is to be folded back the pitman-rod is unhooked and the bolts *g g* are taken out. The finger-bar is then connected to the coupling-arm J only by the pivot or hinge 7. The coupling-arm having been raised up by the lever R, the finger-beam and shoe rises with it, and when up a sufficient height the finger-bar M is, or may be, folded up and turned on the pivot 7 until its outer end, or the caster thereon, meets the ground, when that end will ride over the ground, the other end being supported on the pivot 7, and thus the width of the machine may be very much contracted without raising the finger-bar up and leaning it against the frame; or the finger-beam may be put into and occupy the same position near and parallel to the wheel by simply turning the said beam so that the guards will point upward, and allowing it to swing around into its position, as above mentioned.

What I claim under this invention, and desire to secure by Letters Patent, is—

1. The short finger-beam hinged to the coupling arm or brace, so that said finger-beam may be raised up and folded to the rear in line with the driving-wheels, substantially as and for the purpose described.

2. So constructing and arranging the hinged or pivoted point on which the finger-beam is thus folded backward as that the outer or free end of said finger-beam, in its folded position, may conform to the inequalities of the ground over which it is drawn, and independent of the vertical movement of the machine, substantially as described.

W. K. MILLER.

Witnesses:
A. B. STOUGHTON,
EDM. F. BROWN.